United States Patent
Straitiff et al.

(10) Patent No.: US 10,735,201 B1
(45) Date of Patent: Aug. 4, 2020

(54) METHOD AND APPARATUS FOR KEY PRINTING

(71) Applicant: Marriott International, Inc., Bethesda, MD (US)

(72) Inventors: David M. Straitiff, East Amherst, NY (US); Gregory J. Durrer, Olney, MD (US); Suraj Saraf, Chesterfield, MO (US); Neil R. Schubert, III, Clarksburg, MD (US); Naveen Singhal, Herndon, VA (US); Nathan Van Orden, Boyds, MD (US)

(73) Assignee: MARRIOTT INTERNATIONAL, INC., Bethesda, MD (US)

(*) Notice: Subject to any disclaimer, the term of this patent is extended or adjusted under 35 U.S.C. 154(b) by 343 days.

(21) Appl. No.: 15/212,036

(22) Filed: Jul. 15, 2016

Related U.S. Application Data

(60) Provisional application No. 62/193,851, filed on Jul. 17, 2015.

(51) Int. Cl.
*H04L 9/32* (2006.01)
*H04L 29/06* (2006.01)
*H04W 12/04* (2009.01)

(52) U.S. Cl.
CPC .......... *H04L 9/3247* (2013.01); *H04L 63/061* (2013.01); *H04L 63/0853* (2013.01); *H04W 12/04* (2013.01)

(58) Field of Classification Search
None
See application file for complete search history.

(56) References Cited

U.S. PATENT DOCUMENTS

| | | | | |
|---|---|---|---|---|
| 9,710,987 | B2* | 7/2017 | Scoggins | G07C 9/00904 |
| 2004/0046018 | A1* | 3/2004 | Dobbins | G07C 9/00142 |
| | | | | 235/382.5 |
| 2005/0138387 | A1* | 6/2005 | Lam | G06F 21/123 |
| | | | | 713/185 |
| 2012/0022902 | A1* | 1/2012 | Gressel | G06Q 10/02 |
| | | | | 705/5 |
| 2013/0096963 | A1* | 4/2013 | Craig | G06Q 10/02 |
| | | | | 705/5 |
| 2013/0200999 | A1* | 8/2013 | Spodak | G05B 1/01 |
| | | | | 340/5.65 |

(Continued)

FOREIGN PATENT DOCUMENTS

EP 2833572 A1 * 2/2015 ............ H04B 10/85

*Primary Examiner* — Fatoumata Traore
(74) *Attorney, Agent, or Firm* — Kilpatrick Townsend & Stockton LLP

(57) ABSTRACT

System and methods for key printing may include a control panel operable to receive a mobile device identifier from a mobile device. A property management system in communication with the control panel may assign or allocate a room in a hotel to a guest. A lock server may be in communication with the property management system, the lock server may create a digital key. A virtual encoder may be in communication with the property management system and the lock server, the virtual encoder may transmit a room number, lock information, authorized zones, a start time, an expiration, and the digital key to the mobile device. A key printer may receive the digital key from the mobile device, authenticate the mobile device, and print a physical key based on the received digital key.

21 Claims, 7 Drawing Sheets

(56) References Cited

U.S. PATENT DOCUMENTS

| | | | | |
|---|---|---|---|---|
| 2013/0262158 A1* | 10/2013 | You | ............... | G06Q 10/02 705/5 |
| 2016/0098689 A1* | 4/2016 | Bowles | ............... | G06Q 20/18 705/23 |
| 2017/0345237 A1* | 11/2017 | Kuenzi | ............... | G07C 9/00119 |

* cited by examiner

METHOD AND APPARATUS FOR KEY PRINTING

CROSS REFERENCE TO RELATED APPLICATIONS

This application claims priority to U.S. Provisional Application No. 62/193,851, filed on Jul. 17, 2015, the content of which is hereby incorporated herein by reference in its entirety.

BACKGROUND

Field of Invention

Embodiments relate to printing a physical key from a digital key stored on a mobile device.

SUMMARY

A key printing system may include: a control panel operable to receive a mobile device identifier from a mobile device; a property management system in communication with the control panel, the property management system operable to assign access to a restricted area to a user; a lock server in communication with the property management system, the lock server operable to create a digital key; a virtual encoder in communication with the property management system and the lock server, the virtual encoder operable to transmit a restricted area identifier, lock information, authorized zones, a start time, an expiration, and the digital key to the mobile device; and a key printer operable to: receive the digital key from the mobile device, authenticate the mobile device, and print a physical key based on the digital key.

A key printing method may include: establishing, by a check-in computer system, a connection with a mobile device; creating, by the check-in computer system, a digital key associated with one or more secured areas; transmitting, by the check-in computer system, the digital key to the mobile device; receiving, by a key printing system, a connection request from the mobile device; establishing, by the key printing system, an exclusive connection with the mobile device; receiving, by the key printing system, the digital key from the mobile device; authenticating, by the key printing system, the mobile device; and transforming, by the key printing system, the digital key to a physical key by printing a physical key.

A key printing system may include a kiosk having a housing. The kiosk may include: a physical key printer; a receiver that is configured to receive digital key information from a mobile device of a user based on user input provided to at least one of the kiosk or the mobile device, the digital key information including an encrypted digital key; a memory storing instructions; and a processor that is configured to execute the instructions to perform: validating the mobile device upon receiving the user input and based on credentials information; upon successfully validating the mobile device, extracting a digital key from the mobile device; producing a physical key for the user using the physical key printer, the physical key having the digital key and being configured to access a restricted area to which the user has privileges; and outputting the physical key through the housing.

A key printing system may include a kiosk having an exterior casing configured to house material to produce a physical key. The kiosk may include: a physical key printer; a receiver operable to receive a mobile device identifier from a mobile device of a user; a memory storing instructions and being configured to store digital key information; and a processor that is coupled to the memory and that is configured to execute the instructions to perform: communicating with an application of the mobile device of the user to receive user input; upon receiving the user input, validating the mobile device; upon successfully validating the mobile device, receiving digital key information from the mobile device; extracting a digital key from the mobile device based on the digital key information; and producing a physical key based on the extracted digital key using the physical key printer and the material to produce the physical key, the physical key being configured, when read by a reader at a restricted area to which the user has privileges, to authenticate the user to the restricted area based on the digital key.

Additional features, advantages, and embodiments of the invention are set forth or apparent from consideration of the following detailed description, drawings and claims. Moreover, it is to be understood that both the foregoing summary of the invention and the following detailed description are examples and are intended to provide further explanation without limiting the scope of the invention as claimed.

BRIEF DESCRIPTION OF THE DRAWINGS

The foregoing and other features and advantages of the invention will be apparent from the following, more particular description of various exemplary embodiments, as illustrated in the accompanying drawings wherein like reference numbers generally indicate identical, functionally similar, and/or structurally similar elements. The first digits in the reference number indicate the drawing in which an element first appears.

DESCRIPTION OF THE EMBODIMENTS

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. A person skilled in the relevant art will recognize that other components and configurations may be used without parting from the spirit and scope of the embodiments. It is to be understood that each specific element includes all technical equivalents that operate in a similar manner to accomplish a similar purpose. The examples and embodiments described herein are non-limiting examples.

U.S. Provisional Patent Application No. 62/113,219, filed on Feb. 6, 2015, is incorporated herein by reference in its entirety. All publications cited herein are hereby incorporated by reference in their entirety.

As used herein, the term "a" refers to one or more. The terms "including," "for example," "such as," "e.g.," "may be" and the like, are meant to include, but not be limited to, the listed examples. The term "product" may refer to both products and services. The term "hotel" may refer to a hotel, motel, or other establishment where a guest or customer may need physical access to a location for a limited period of time. The terms "user," "guest," "client," and/or "customer" may be synonyms. The term key printer, may refer to the key printing device that may physically print a key and also to the key printing system that may connect and/or authenticate a mobile device containing a digital key, and transmit key data to the key printing device.

First Embodiment

Figure 1:
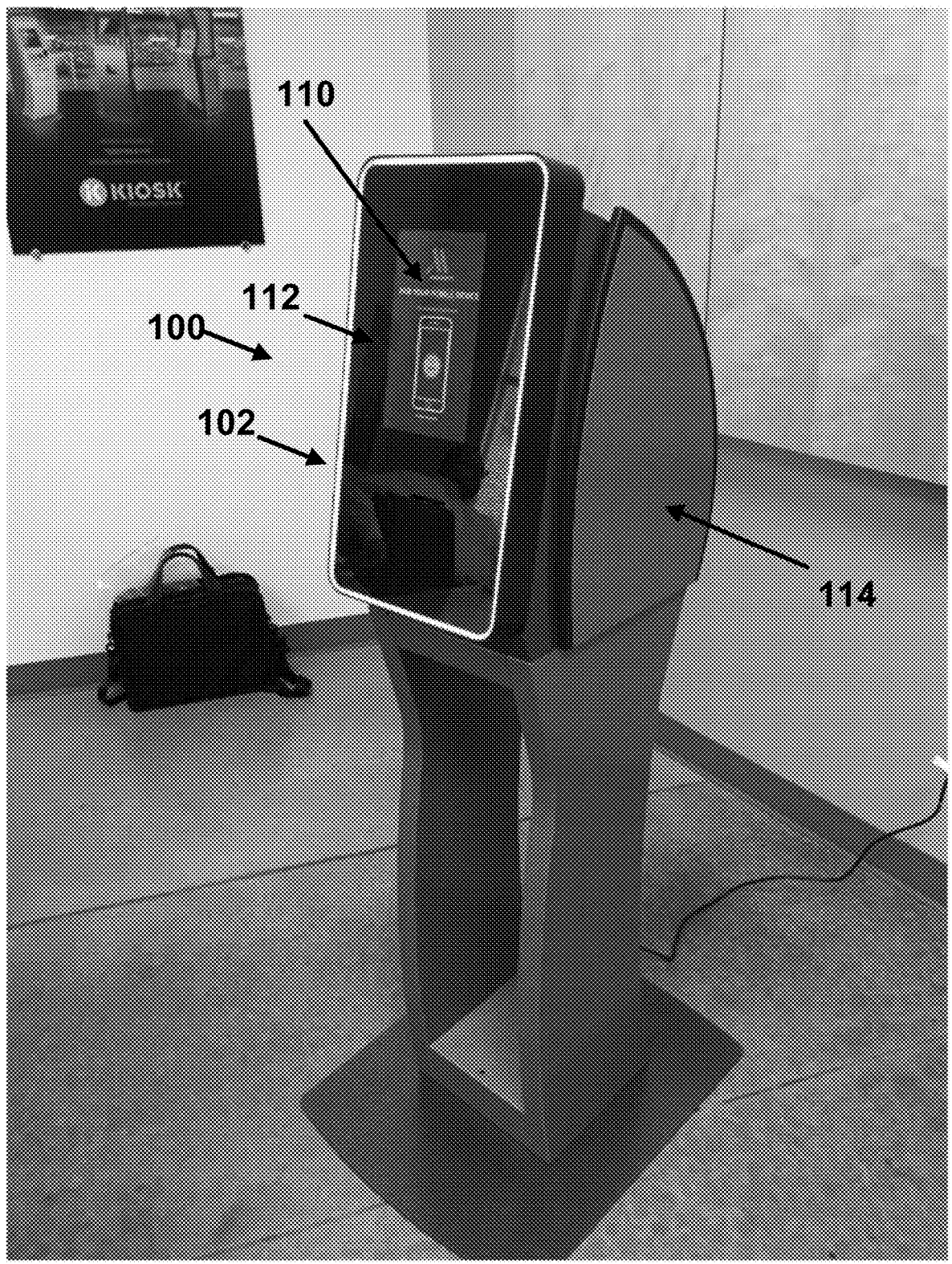
FIG. 1 depicts an example key printing kiosk, according to an embodiment of the invention.

FIG. 1 depicts an example key printing kiosk 102 for use with an embodiment of the invention described herein. Kiosk 102 may allow a user to pair a mobile device with kiosk 102 to transfer credentials, identification, and/or key data from the mobile device to kiosk 102. Kiosk 102 may validate user credentials, identification, and/or key data and may print one or more physical keys that may be used to access restricted areas (e.g., a hotel room, apartment, locker, storage facility, recreational area(s), gym, pool, etc.). The printed key may be restricted to a user-defined, or hotel-defined, time window.

As seen in FIG. 1, a key printing system 100 may include a kiosk 102 having an interface 110 on a display device 112 and a housing 114. The interface 110 may be configured to accept user input.

The kiosk 102 may include a receiver that is configured to receive digital key information from a mobile device of a user based on the user input. For example, the interface may prompt the user to select begin or start. The digital key information may include an encrypted digital key.

The kiosk 102 may further include a memory storing instructions and a processor that is configured to execute the instructions to perform validating the credentials of the mobile device upon receiving the user input and based on the digital key information. Validating the credentials of the mobile device may include decrypting the encrypted digital key into a digital key and a shared key and may include challenging and authenticating the mobile device based on the shared key. The processor may be configured to perform establishing an exclusive connection to the mobile device prior to receiving the digital key information. The processor may be configured to perform detecting the mobile device prior to establishing the exclusive connection and changing the interface based on the detecting.

Upon successfully validating the credentials of the mobile device, the processor may be configured to perform extracting a digital key from the mobile device.

The processor may be configured to perform producing a physical key for the user. The physical key may be encoded to include or to have the digital key. The physical key may be configured to access a restricted area to which the user has privileges. The physical key may comprise one of a magnetic stripe, an RFID card, or a bar code to encode the digital key information. The processor may be configured to perform outputting the physical key through the housing.

The processor may be configured to perform validating the credentials, extracting the digital key, and producing the physical key while offline.

The digital key may be assigned to the restricted area to which the user has been granted privileges. The digital key may be created using a lock server.

The key printing system may include a card hopper that is disposed inside the housing. The card hopper may be configured to hold a plurality of physical keys.

Figure 2:
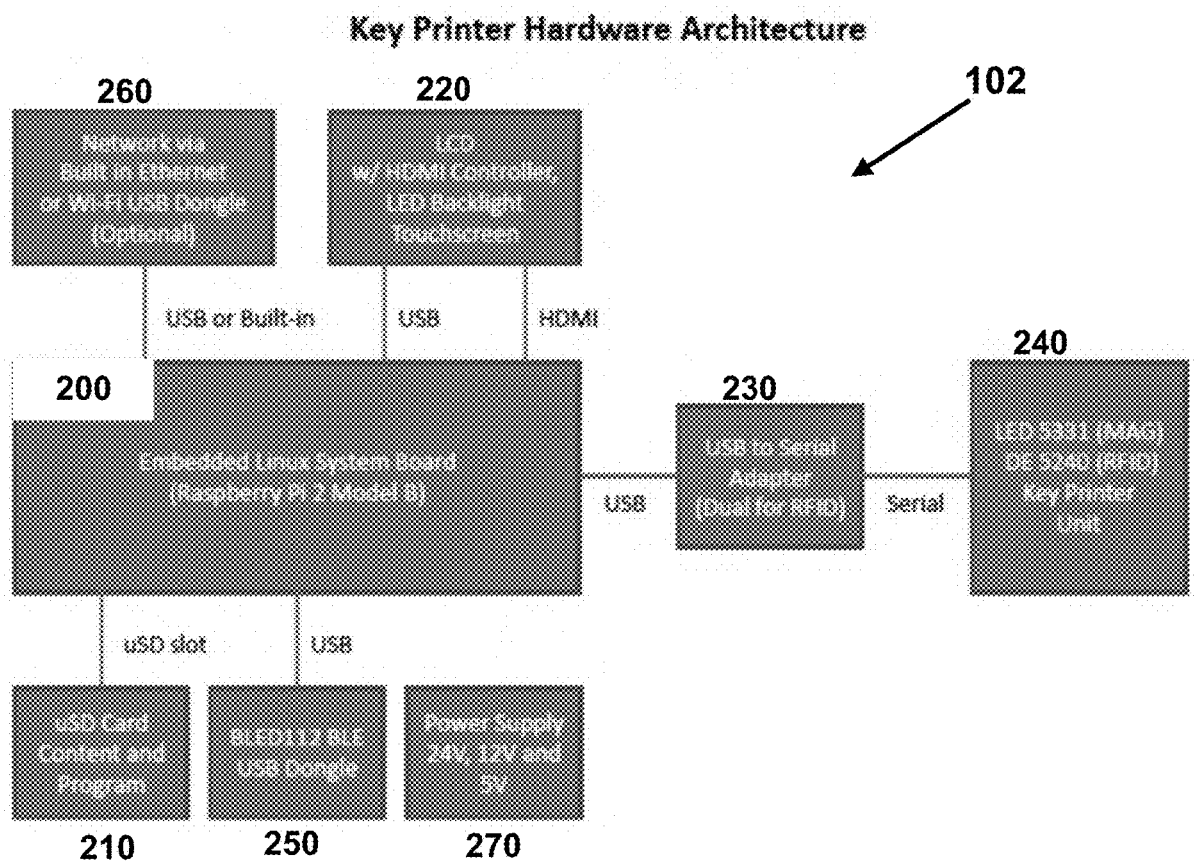
FIG. 2 depicts an example hardware architecture diagram for a key printer.

FIG. 2 depicts an example hardware architecture diagram which may be used in, for example, kiosk 102. FIG. 2 depicts a system board 200 that may control the operation of kiosk 102 to perform various functionalities. System board 200 may be, for example, a system board running embedded Linux (e.g., Raspberry PI 2 model B). System board 200 may be in communication with, for example, memory 210, display 220, adapter 230, printer 240, wireless communication device 250, network connector 260, and/or power supply 270.

Memory 210 may include instructions such as software to control system board 200 and attached hardware peripherals. Memory 210 may be, for example, an SD card, microSD card, flash memory, or other memory storage device.

Display 220 may include an interface, for example, a touchscreen LCD display that may supply information to a user and may allow the user to provide input to system board 200. System board 200 may communicate to display 220 using, for example, an HDMI and/or USB controller. sw Printer 240 may print physical keys based on the instructions provided from system board 200. Printer 240 may print, for example, bar code, magnetic stripe, smart, or RFID cards. In one embodiment, printer 240 may be, for example, the LED 5331 magnetic card issuing machine or the DE 5240 RFID card issuing machine both from Digital Concept Design. System board 200 may need to interface with an adapter, such as adapter 230 to send instructions to printer 240. Adapter 230 may be, for example, a USB to serial adapter or a dual USB to serial adapter.

Wireless communication device 250, may provide connectivity between the system board 200 and a user device (e.g., mobile device). Wireless communication device 250 may use short-range communication technologies such as, for example, Bluetooth, Bluetooth Low Energy, and/or Near Field Communication (NFC) (e.g., ISO 13157, IEEE 802.15.1, etc.). In an embodiment, wireless communication device 250 may be, for example, a BLED 112 Bluetooth Smart Low Energy Dongle by Silicon Labs.

Network connector 260 may connect system board 200 to a network of interconnected devices (e.g., a local area network, the Internet, etc.). Network connector 260 may be built-in to the system board 200 or may be available via an external connector (e.g., USB dongle). Network connector 260 may provide a wired (e.g., cable) or wireless connection (e.g., Wi-Fi) and may use, for example, Ethernet. Network connector 260 may be optional and may not be required for functioning of kiosk 102 (e.g., kiosk 102 may provide key printing functionality without requiring network access to external computer systems other than the mobile device). As such, kiosk 102 may operate as a stand-alone device without a network connection. Further kiosk 102 may print keys as a stand-alone device without a network connection.

Power supply 270 may provide the needed power to the system board 200. Power supply 270 may provide, for example, 24V, 12V, and/or 5V.

Figure 3:
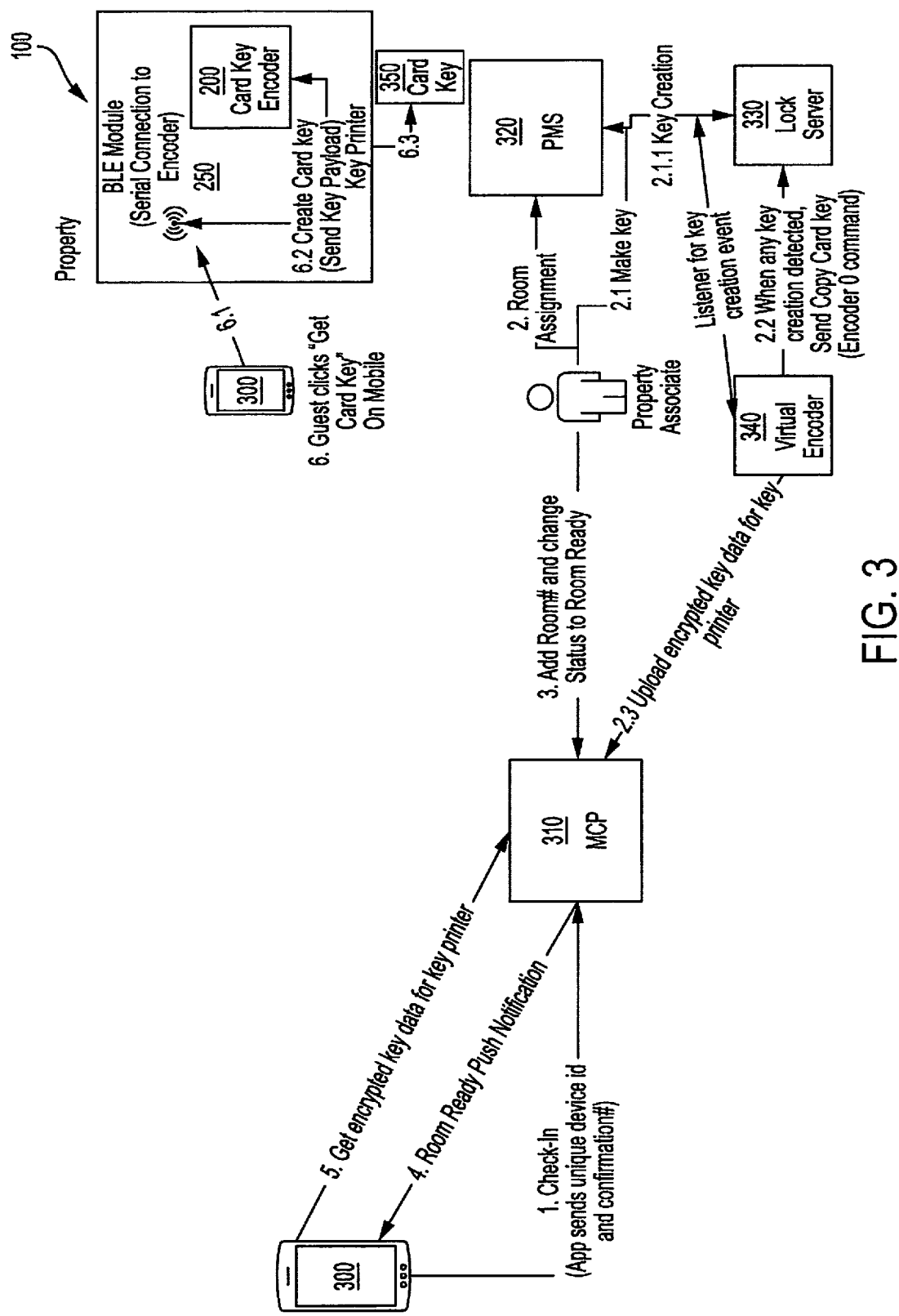
FIG. 3 depicts an example high-level workflow for actively generating and printing mobile digital keys.

FIG. 3 depicts an example high-level workflow for actively generating and printing physical keys based on the digital key. In an embodiment, a guest may provide a hotel with identification information. Guest may use mobile device 300 to communicate identification information to the hotel (e.g., a check-in computer system). Mobile device 300 may include a smartphone or tablet such as, for example, an Apple, Android, or Windows device. Identification information may include guest name and/or a device identifier of mobile device 300. Control panel 310 (e.g., a Hotel-based control panel (MCP)) may be used to receive identification information from mobile device 300. Either using an automated process or through an employee of the hotel, a room may be assigned to the guest using, for example, control panel 310 and property management system (PMS) 320.

Once a room is assigned, a digital key may be created for the assigned room using lock server 330. Virtual encoder 340 may be triggered when the digital key is created and may receive a digital key from lock server 330. Virtual encoder 340 may upload key and access authorization to control panel 310. Virtual encoder 340 may be implemented using standalone hardware such as described in FIG. 6 with integrated software. In another embodiment, virtual encoder 340 may be software running on a multipurpose server. Control panel 310 may assign the key to mobile device 300. In other embodiments, use of control panel 310 may be eliminated and the key may be assigned to mobile device 300 by the same system used to assign guest rooms (e.g., the Property Management System (PMS) 320).

Control panel 310 may receive the assigned room number, and the status of the room may change to "ready" and may trigger a room ready notification. The control panel 310 may receive a restricted area identifier that corresponds to a room number. Hotel-based control panel 310 may upload key data to, for example, storage (e.g., cloud storage). Data stored/transmitted from control panel 310 may include key card data, unique device ID, property code, confirmation number, duration, room number (e.g., lock identifier), and/or other guest information such as status that may authorize entry into additional locations (e.g., executive lounge). Storage may be one or more servers internal to the hotel or may be one or more servers accessible through the internet. Storage may be a credential server. The credential server may securely receive and store a digital key from a control panel 310, for example, and then securely deliver a digital key to mobile device 300 upon request.

The guest may receive a room ready notification on mobile device 300, and may recommend and/or instruct the guest on how to receive a mobile key. The guest may use mobile device 300 to request a mobile key, which may be transmitted to the mobile device 300 (e.g., the digital key payload is pushed to the mobile device 300).

The Guest may use mobile device 300 with the received mobile key to request entry into the assigned room. The room may have a door with an attached lock that may be opened with proper authorization. The lock may be able to receive communications such as Wi-Fi, Near Field Communication (NFC), Bluetooth, and/or Bluetooth Low Energy (BLE). The lock may receive the mobile key from mobile device 300, and may authenticate guest for entry into the location (e.g., hotel room, lounge, gym, pool, conference center, business office, etc.).

Alternatively, or in addition, the guest may use mobile device 300 to print a physical key. As described above, when a guest checks-in at a participating property, control panel 310 may generate an encrypted digital key payload. The digital key payload may then be 'pushed' to the application residing on the guest's mobile device 300. The guest may go near kiosk 102 and select the appropriate software application on mobile device 300. The mobile device 300 may establish an exclusive connection to kiosk 102. Mobile device 300 may send the encrypted digital key payload to kiosk 102 (e.g., the digital key payload may be formatted and sent to a key printer API). Kiosk 102 may receive the digital key and may authenticate mobile device 300. If the mobile device 300 is successfully authenticated, kiosk 102 may print a physical card based on the digital key supplied by mobile device 300. In one embodiment, there may be no direct communication between control panel 310 and key printer 240.

For the high level flow in FIG. 3:

Step 1: Guest Authenticates with POC application using Last Name and Confo #.

Step 2: Room is ready. Property associate assigns a room in PMS and creates key card via PMS Step 3: Property Associate adds Room # to POC Control Panel. This changes reservation status to Room Ready and triggers Room Ready notification.

Step 4: Guest receives room ready notification. Notification recommends guest to get Mobile key.

Step 5: Guest clicks 'Get Room Key.'

Step 6: Guest goes near key printer and clicks 'Get Plastic Card.'

Step 6.1: Mobile app connects with BLE module and sends encrypted key payload.

Step 6.2: BLE module decrypts legacy key payload and sends it to card key encoder.

Step 6.3: Key encoder encodes card key and dispenses it.

Figure 4:
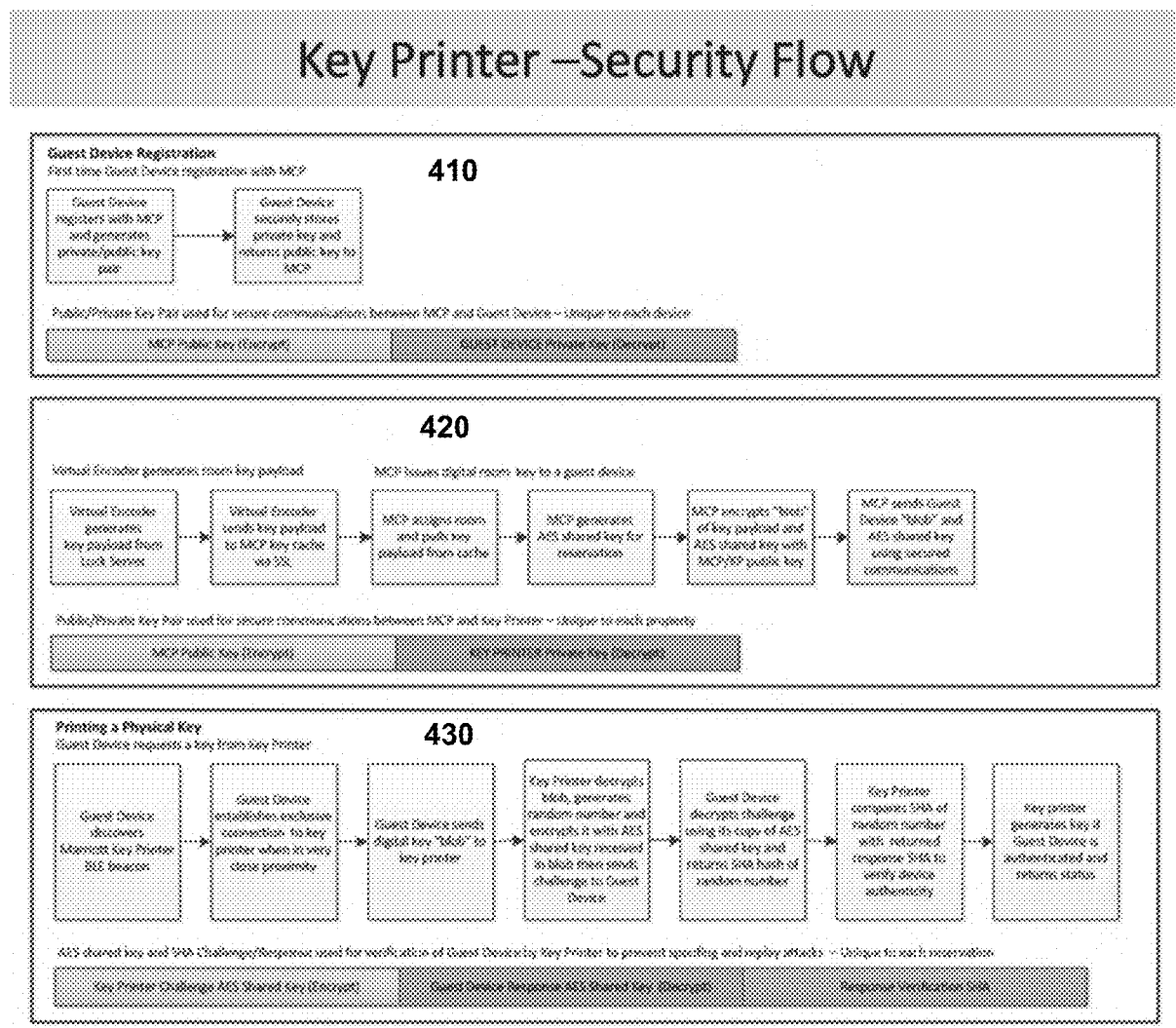
FIG. 4 depicts example high-level security workflows for actively generating and printing mobile digital keys.

FIG. 4 depicts example high-level security workflows for actively generating and printing mobile digital keys. In 410, mobile device 300 may register with control panel 310 and generate a private/public key pair. Mobile device 300 may securely store private key and may return public key to control panel 310. The public key may be used to encrypt, while the private key may be used by, for example, the mobile device 300 to decrypt.

In 420, virtual encoder 340 may generate a key payload using lock server 330. Virtual encoder 340 may securely transmit the key payload to control panel 310. The key payload may be stored in a key cache accessible by control panel 310. Control panel 310 may assign a room to a guest and retrieve the stored key payload. Control panel 310 may generate a shared key (e.g., an AES shared key) for the reservation. Control panel 310 may encrypt the key payload and shared key with a public key. Control panel 310 may securely transmit the encrypted package to mobile device 300.

In 430, a guest may wish to have a physical key. Mobile device 300 may discover Wireless communication device 250 (e.g., radio transmitter, BLE beacon, etc.) of kiosk 102. Mobile device 300 and kiosk 102 may establish an exclusive connection. Mobile device 300 may send encrypted digital key package to kiosk 102. Kiosk 102 may decrypt digital key package to retrieve both a digital key and a shared key. Kiosk 102 may challenge and authenticate mobile device 300. For example, kiosk 102 may encrypt a random number with the shared key and send as a challenge to mobile device 300. Mobile device 300 may decrypt the random number using the shared key and may transmit a hashed version (e.g., SHA hash) of the random number to kiosk 102. Kiosk 102 may compare the received value to verify the authenticity of mobile device 300. If mobile device 300 is authenticated, kiosk 102 may use the received digital key to print a physical key.

Figure 5:
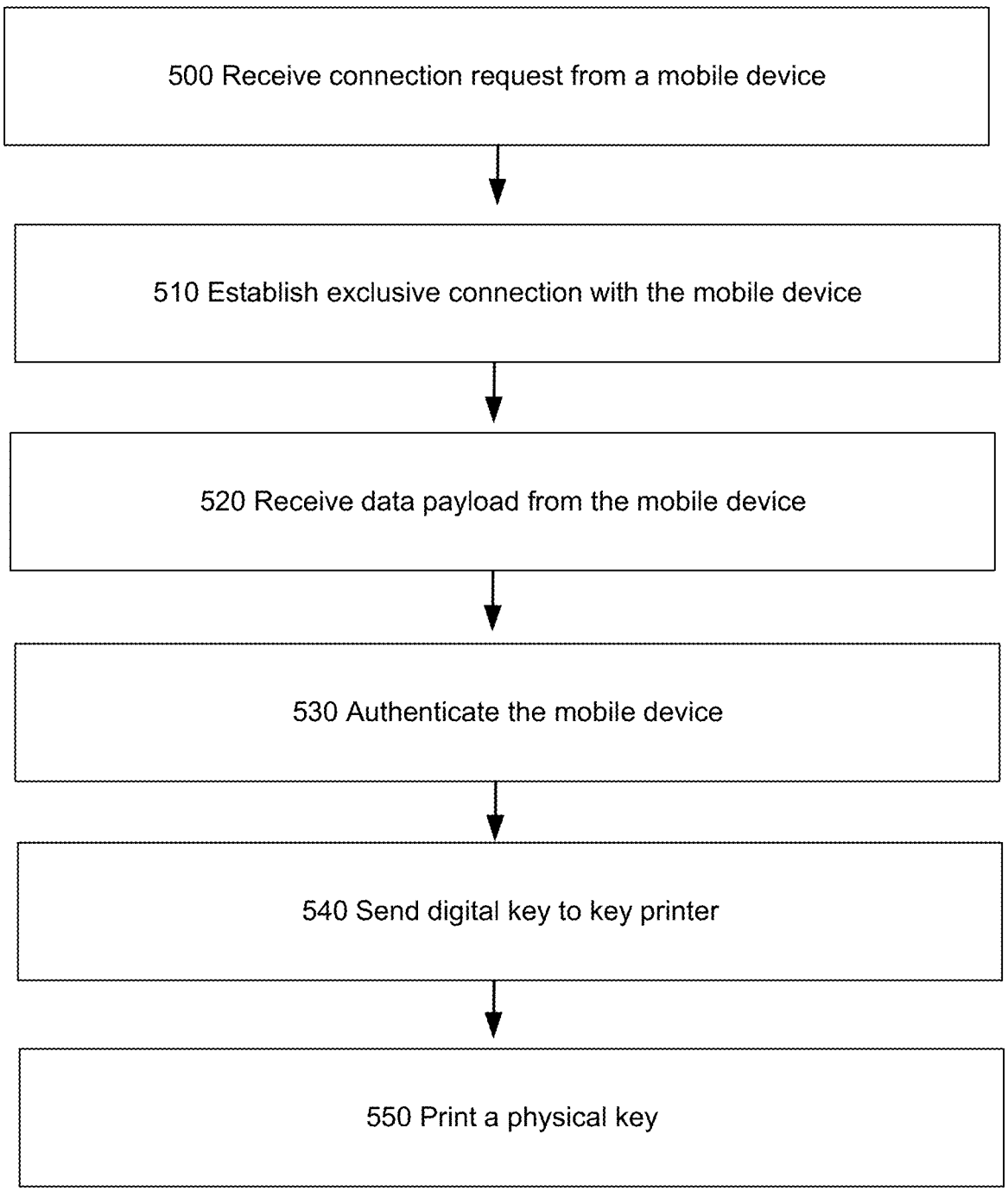
FIG. 5 depicts an example workflow for printing a physical key using a key printer.

FIG. 5 describes the workflow within kiosk 102 for printing a physical key. For example, in 500, kiosk 102 may receive a connection request from mobile device 300.

Mobile device 300 may include support for Bluetooth Low Energy (BLE) and/or other communication protocols to communicate with kiosk 102. From 500, flow may move to 510.

In 510, kiosk 102 may establish an exclusive connection (e.g. paired) with mobile device 300. Display 220 of kiosk 102 may display the status through the various stages of the connection process. For example, display 220 may present a "connect" screen once a connection between kiosk 102 and mobile device 300 is established. In one embodiment, when a user (e.g., guest) activates the app using the mobile device 300 to print a key and places mobile device 300 close to display 220 of kiosk 102, kiosk 102 may create an exclusive connection as soon as kiosk 102 detects mobile device 300 directly in front of display 220. To help ensure an exclusive connection, mobile device 300 may monitor the BLE signal level strength and when the BLE signal reaches a predetermined strength, mobile device 300 is considered in front of the kiosk and mobile device 300 initiates a connect request. This prevents a different user with a different mobile device from printing a key by accident or on purpose (e.g., a guest standing in line behind a first guest). From 510, flow may move to 520.

In 520, kiosk 102 may receive a data payload from mobile device 300. Data payload may be encrypted and may contain a digital key and authentication information. If necessary, kiosk 102 may decrypt the received payload. The digital key data may be dependent on the lock vendor and may take the form of a "digital payload" that represents bits for the key printer 240 to write on a magnetic card and/or to program on an RFID card for the guest key. From 520, flow may move to 530.

In 530, kiosk 102 may authenticate the mobile device 300. For example, kiosk 102 may use the received data payload to challenge and/or authenticate mobile device 300. From 530, flow may move to 540.

In 540, if mobile device 300 is authenticated, kiosk 102 may send the received digital key to key printer 240. Key printer 240 may print key cards with a magnetic stripe and/or embedded RFID, for example. The magnetic stripe version may include a formatted string with the key data that is sent to the key encoder which may have, for example, a built-in hopper (e.g., a container that holds a quantity of cards and manages presenting the individual cards for processing) over serial or USB. For the RFID version, data may be read and written to the RFID card with the proper data using an RFID encoder attached to, for example, a key hopper that may communicate using serial or USB. From 540, flow may move to 550.

In 550, a physical key may be printed. Kiosk 102 may provide a guest a physical key from key printer 240 based on the received data from mobile device 300.

Some examples of software functionality embedded in kiosk 102 (e.g., stored in memory 210) include: scanning for a key printer peripheral with a specific UUID; successful connection with a key printer peripheral; successful retrieval of services and characteristics of the key printer peripheral; successful registration for characteristic notification updates; successful reads and writes to characteristics; and successful handling of events and key printer statuses.

Kiosk 102 software (e.g., stored in memory 210) may handle interactions with key printer 240 though, for example, a Key Printer API, and may manage, for example, the BLE lifecycle and processes associated with statuses, errors, validations, and control of the print attempts. Properties and methods for interacting with key printer 240 may include, for example: kNotificationKeyPrinterLogging—a NSNotification that contains information relevant for MCP logging; KeyPrinterStatus—an enumeration that defines the status codes returned by the key printer API; KeyPrinterBluetoothError—an enumeration that defines the error states associated when interacting with the BLE-related tasks, to include those tasks for implementing the iOS Bluetooth framework and the key printer API; KeyPrinterValidationError—an enumeration that defines the validation errors that can occur during the printing process (e.g., when the property IDs for the reservation and key printer do not match); a delegate @property of the manager class; a canAttemptPrint @property that defines the current printable state; a sharedManager method that returns a manager singleton instance; two startScanning methods that kick-off the peripheral scanning and connection process; a stopScanning method that stops the peripheral scanning and connection process; a reset method that puts the manager class in a default state; and a printKey method to attempt to print a plastic key card.

Additional functionality may add attributes to, for example, Core Data model objects (e.g., storing the encrypted digital key payload). The room key information including the encrypted "blob" containing the digital key may be stored locally on mobile device 300 once the key is downloaded to facilitate off-line use. The blob may be only valid for a particular reservation and a new session key and a different encrypted blob may be provided for each reservation.

Second Embodiment

Figure 6:
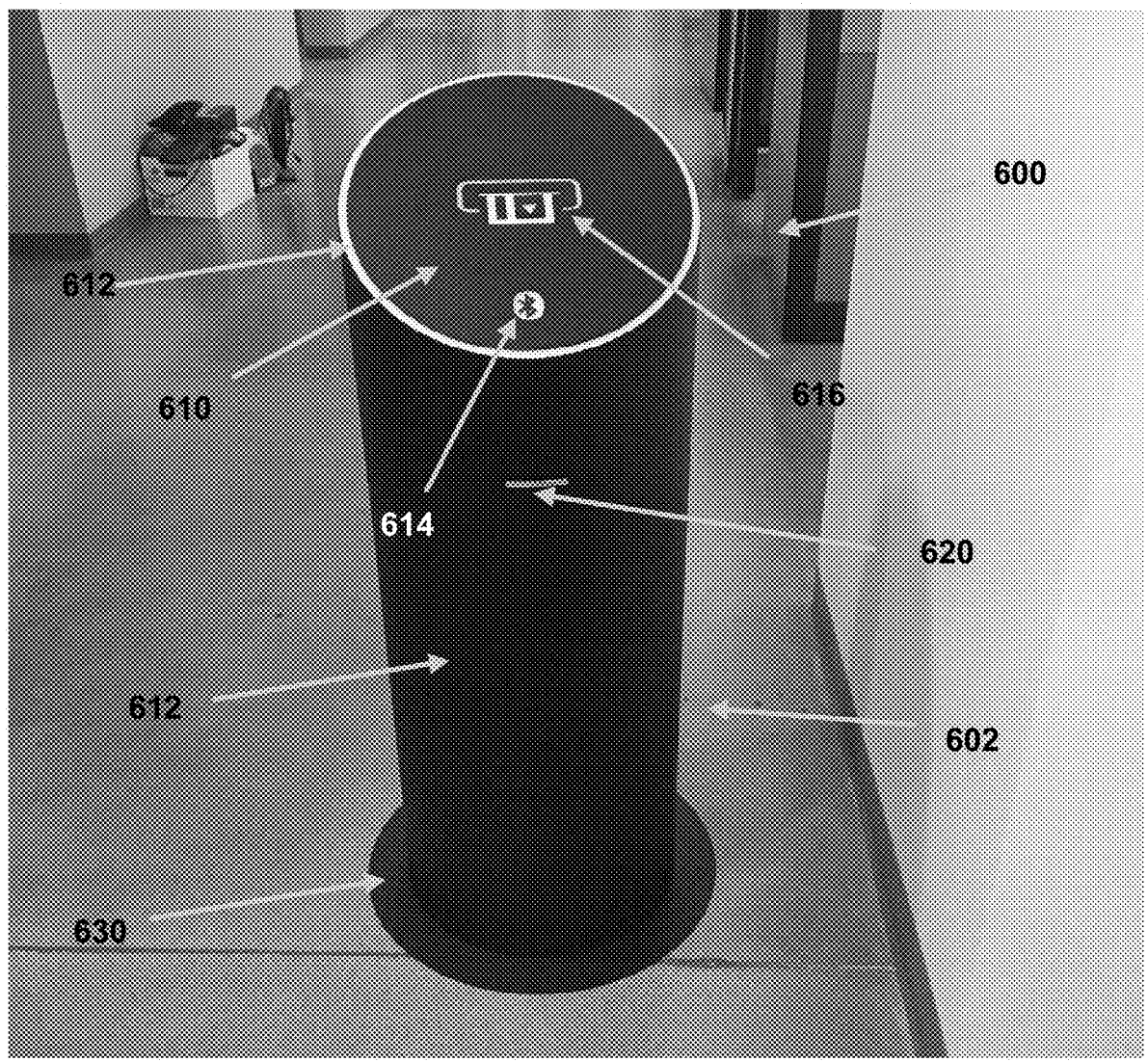
FIG. 6 depicts an example key printing kiosk, according to a second embodiment of the invention.

FIG. 6 depicts an example key printing kiosk, according to a second embodiment of the invention. While specific features and implementations not described above will be described with regard to this embodiment, it is to be understood that these specific features and implementations can be applied to embodiments heretofore described. Also, even if specific features and implementations previously described with respect to other embodiments are not specifically mentioned with respect to this second embodiment, the second embodiment is intended to include such features and implementations. Thus, FIGS. 1-5 are intended to be consistent with the embodiments hereinafter described.

In the second embodiment of the invention, as shown in FIG. 6, a key printing system 600 may include a kiosk 602 having an exterior housing 604 that is configured to house material for a physical key. The exterior housing 604 may be substantially cylindrically shaped. A top surface 610 of the exterior housing 604 may be angled towards a front portion of the key printing system to allow for a user to easily interface with the key printing system. This angled top surface 610 may include an outer LED ring or circular border region 612, and may include one or more inner elements. For example, the top surface 610 may include a bluetooth symbol 614 that may light up when prompted as described below. The top surface may also include a card symbol 616 that may light up when prompted as described below. The kiosk 602 may include a base 630, which may have a substantially circular cross-sectional shape.

The material for a physical key may include rectangular plastic card(s) with mechanical holecards, barcodes, magnetic stripes, wire embedded cards, smart cards (embedded with a read/write electronic microchip), and RFID proximity cards. The key printing system 600 may include a receiver operable to receive a mobile device identifier from a mobile device of a user. The physical key may include a secure element that is configured to securely encapsulate cryptographic functionality of the digital key. The secure element may employ a public key infrastructure.

In this embodiment, a secure element (e.g., Javacard) may be incorporated into the key printing system that may allow proprietary key algorithms from the lock vendors to be securely encapsulated while providing the ability to generate an off-line key. For example, with RFID the key may have a unique id (UID) which may be used to further generate a unique image for the key. A block of data may be passed in with the key information, along with the UID. This block of data may allow a Mifare or NFC image file to be returned or generated. The image file may be written to create the RFID key. The secure element may take the form of a USB device or Smartcard. The physical key may include a smart card computing environment that supports cryptographic functions for the secure encapsulation. This smart card computing environment may be Java Card. The kiosk 602 may include a memory storing instructions and may be configured to store digital key information.

The kiosk 602 may include a processor that is coupled to the memory and that is configured to execute the instructions to perform communicating with a user interface on an application of the mobile device of the user to receive user input. That is, an application on the mobile device may receive user input to initiate a communication request. This communication request may be a request to exclusively communicate between the key printing system and the mobile device, for example, by pairing the devices. The communicating with the user interface may include transmitting signal strength of the mobile device to the receiver. The signal strength may be based on a distance of the mobile device to the receiver. The receiver may be a bluetooth low energy device.

The kiosk 602 may include a physical key printer. This physical key printer may be enclosed within the housing of the kiosk 602. The physical key printer may be, for example, a card hopper configured to hold a plurality of physical keys.

Upon receiving the user input, the processor may be configured to perform validating the credentials of the mobile device. Validating the credentials may be based on the received digital key information from the mobile device, in a similar manner discussed in reference to the first embodiment. Validating the credentials may take place only after meeting a predetermined threshold of signal strength.

Upon successfully validating the credentials of the mobile device, the processor may be configured to perform receiving digital key information from the mobile device.

The processor may be configured to perform extracting a digital key from the mobile device based on the digital key information. The extracted digital key may be a key that is associated with a physical room, access area or restricted area. The processor may be configured to perform producing a physical key based on the extracted digital key. The physical key may be configured, when read by a reader at a restricted area to which the user has privileges, to authenticate the user to the restricted area based on the digital key.

The key printing system may be configured to perform validating the credentials, extracting the digital key, and producing the physical key while offline. Thus, the key printing system may support online or offline key printing. In an embodiment, the key printing takes place offline so that a network is not required, which may allow the key printing system to be located in places that may not have a network connection. In this embodiment, to generate a key with the key printer, the guest only needs to bring the guest's mobile device to the kiosk 602.

In the first embodiment, the key printing system may include an LCD screen to provide feedback to the guest. This second embodiment removes the LCD screen and uses a set of LEDs in the kiosk 602 which may be controlled by the processor to provide feedback to the guest. Thus, the key printing system may not require a touchscreen or interaction with the physical kiosk. Instead, the mobile device may be the primary interaction point. Color and cadence (flashing or status) may be controlled by the processor to provide various statuses. Thus, in some embodiments as described above the interface may rotate through various status pages during the key printing process such as "Connected," "Printing," "Please take your key," "An Error Occurred please go to front desk." In some embodiments, as described herein, the exterior of the housing may include colors and flashing LEDs for such statuses. Outer LED ring 612 may be used for brand identity and aesthetics. Middle Logo 616 may include a status indicator as green when ready, flashing green while printing, red or solid green for status of print when complete. LEDs at the card slot 620 may also be controlled to indicate that the card is ready. All the feedback may be provided on the guest's mobile device in conjunction with these light status states.

Bluetooth symbol 614 may indicate that the key printing system is a BLE device to the guest. The bluetooth symbol 614 may be solid blue when a user approaches the kiosk or when pairing of the mobile device with the receiver takes place. The signal strength and connection logic may be managed in the mobile device application. The mobile device may monitor the signal strength and only allow a connection when it is very close to the Key Station.

The mobile device may be utilized as a "back channel" to return data, such as status and metrics, to external systems. These data may include items such as, for example, when, how many times and which key printer was used to generate the key.

Illustrative Computer System

Figure 7:
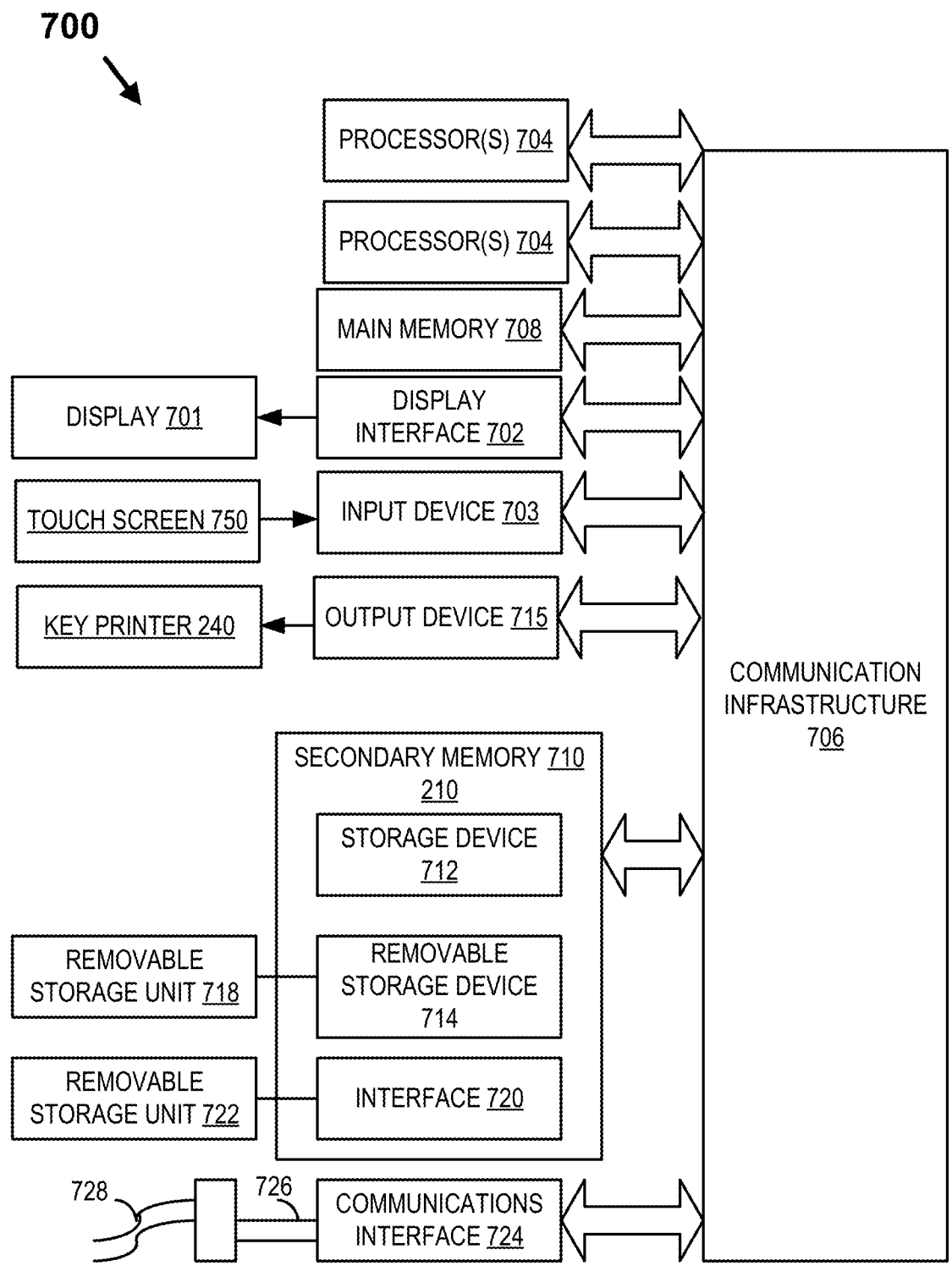
FIG. 7 depicts an illustrative embodiment of a computer for performing the methods and building the systems described herein.

FIG. 7 depicts an illustrative computer system that may be used in implementing an illustrative embodiment of the present invention. Specifically, FIG. 7 depicts an illustrative embodiment of a computer system 700 that may be used in computing devices such as, e.g., but not limited to, stand-alone or client or server devices. FIG. 7 depicts an illustrative embodiment of a computer system that may be used as client device, or a server device, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 700 is shown in FIG. 7, depicting an illustrative embodiment of a block diagram of an illustrative computer system useful for implementing embodiments of the present invention. Specifically, FIG. 7 illustrates an example computer 700, which in an illustrative embodiment may be, e.g., (but not limited to) a personal computer (PC) system or mobile device running an operating system such as, e.g., (but not limited to) MICROSOFT® WINDOWS® NT/98/2000/XP/Vista/Windows 7/Windows 8, etc. available from MICROSOFT® Corporation of Redmond, Wash., U.S.A. or an Apple computer or mobile device executing MAC® OS, OS X, or iOS from Apple® of Cupertino, Calif., U.S.A., or a computer or system board running a Linux or other UNIX derivative. However, the invention is not limited to these platforms. Instead, embodiments of the invention may be implemented on any appropriate computer system running any appropriate operating system. In one illustrative embodiment, the present invention may be implemented on a computer system operating as discussed herein. An illustrative computer system, computer 700 is shown in FIG. 7. Other components of the invention, such as, e.g., (but not limited to) a computing device, a communications device, a telephone, a personal digital assistant (PDA), a Raspberry PI, an iPhone, an iPad, a Surface, an Android device, a Windows Mobile device, a 3G/4G wireless device, an LTE device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 6. In an illustrative embodiment, services may be provided on demand using, e.g., an interactive television device (iTV), a video on demand system (VOD), via a digital video recorder (DVR), and/or other on demand viewing system. Computer system 700 and/or parts of computer system 700 may be used to implement mobile device 300, control panel 310, virtual encoder 340, lock server 330, property management system 320, cloud storage, kiosk 102, 602, system board 200, key printer 240, and/or other components as described in FIGS. 1-3 and 6 and techniques described in FIGS. 4 and 5.

The computer system 700 may include one or more processors, such as, e.g., but not limited to, processor(s) 704. The processor(s) 704 may be connected to a communication infrastructure 706 (e.g., but not limited to, a communications bus, cross-over bar, interconnect, or network, etc.). Processor 704 may include any type of processor, microprocessor, or processing logic that may interpret and execute instructions (e.g., for example, a field programmable gate array (FPGA)). Processor 704 may comprise a single device (e.g., for example, a single core) and/or a group of devices (e.g., multi-core). The processor 704 may include logic configured to execute computer-executable instructions configured to implement one or more embodiments. The instructions may reside in main memory 708 or secondary memory 710. Secondary memory 710 may include memory 210. Processors 704 may also include multiple independent cores, such as a dual-core processor or a multi-core processor. Processors 704 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 700 may include a display interface 702 that may forward, e.g., but not limited to, graphics, text, and other data, etc., from the communication infrastructure 706 (or from a frame buffer, etc., not shown) for display on the display unit 701. The display unit 701 may be, for example, a television, a computer monitor, iPad, a mobile phone screen, a touch screen, etc. The output may also be provided as sound through, for example, a speaker.

The computer system 700 may also include, e.g., but is not limited to, a main memory 708, random access memory (RAM), and a secondary memory 710, etc. Main memory 708, random access memory (RAM), and a secondary memory 710, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 710 may include, for example, (but is not limited to) a hard disk drive 712 and/or a removable storage drive 714, representing a floppy diskette drive, a magnetic tape drive, an optical disk drive, a compact disk drive CD-ROM, flash memory, etc. The removable storage drive 714 may, e.g., but is not limited to, read from and/or write to a removable storage unit 718 in a well-known manner. Removable storage unit 718, also called a program storage device or a computer program product, may represent, e.g., but is not limited to, a floppy disk, magnetic tape, optical disk, compact disk, etc. which may be read from and written to removable storage drive 714. As will be appreciated, the removable storage unit 718 may include a computer usable storage medium having stored therein computer software and/or data.

In alternative illustrative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 722 and interfaces 720, which may allow software and data to be transferred from the removable storage unit 722 to computer system 700.

Computer 700 may also include an input device 603 which may include any mechanism or combination of mechanisms that may permit information to be input into computer system 700 from, e.g., a user. Input device 703 may include logic configured to receive information for computer system 700 from, e.g. a user. Examples of input device 703 may include, e.g., but not limited to, a mouse, pen-based pointing device, or other pointing device such as a digitizer, a touch sensitive display device, and/or a keyboard or other data entry device (none of which are labeled). Other input devices 703 may include, e.g., but not limited to, a biometric input device, a video source, an audio source, a microphone, a web cam, a video camera, a light-sensitive device, and/or other camera. Still other input devices 703 may include, e.g., but not limited to, an imaging device, a touch screen 750, a light-sensitive device, sensing elements, accelerometers, gyroscopes, and/or magnetometers. Input device may include display 220.

Computer 700 may also include output devices 715 which may include any mechanism or combination of mechanisms that may output information from computer system 700. Output device 715 may include logic configured to output information from computer system 700. Embodiments of output device 715 may include, e.g., but not limited to, display 701, and display interface 702, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Output device 715 may include display 220 and key printer 240.

Computer 700 may include input/output (I/O) devices such as, e.g., (but not limited to) input device 703, communications interface 724, cable 728 and communications path 726, etc. These devices may include, e.g., but are not limited to, a network interface card, and/or modems. Communications interface 724 may include wireless communication device 250 and/or network connector 260.

Communications interface 724 may allow software and data to be transferred between computer system 700 and external devices.

In this document, the terms "computer program medium" and "computer readable medium" may be used to generally refer to tangible, non-transitory media such as, e.g., but not limited to, removable storage drive 714, a hard disk installed in hard disk drive 712, memory unit, flash memories, removable discs, non-removable discs, etc. In addition, it should be noted that a computer-readable medium that comprises computer-executable instructions for execution in a processor may be configured to store various embodiments of the present invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may. The various embodiments described herein may be combined and/or features of the embodiments may be combined to form new embodiments.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as an client-server software application, or as a web-enabled software application. It may also be part of a system for detecting network coverage and responsiveness. A general purpose computer may be specialized by storing programming logic that enables one or more processors to perform the techniques indicated herein and the steps of or descriptions shown in, for example, FIGS. 4 and 5.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

What is claimed is:

1. A key printing system for access to a temporary unit for an establishment who controls access to the temporary unit for a limited period of time, comprising:
   a control panel operable to receive a mobile device identifier from a mobile device;
   a property management computer system in communication with the control panel, the property management computer system operable to assign access to a restricted area to a user, wherein the restricted area is the temporary unit;
   a lock server in communication with the property management computer system, the lock server operable to create a digital key for the temporary unit;
   a virtual encoder in communication with the property management computer system and the lock server, the virtual encoder operable to transmit a restricted area identifier corresponding to the temporary unit, lock information, authorized zones, a start time, an expiration, and the digital key to the mobile device, wherein the authorized zones are tied to a status for a guest associated with the mobile device; and
   a key printer for receiving a removable smart card encapsulating a proprietary key algorithm of a lock vendor for the temporary unit, wherein the key printer operable to:
      receive the digital key from the mobile device,
      authenticate, through an exclusive connection with the mobile device, the mobile device, and
      print a physical key with a unique image that is a function of a unique ID (UID) of the physical key and the proprietary key algorithm, wherein:
         the physical key includes the status to provide for enabling access to the authorized zones based on the digital key while off-line; and
         the physical key is operable for access to the temporary unit and authorized zones without any communication from the key printer or mobile device after the physical key is printed.

2. The key printing system of claim 1, wherein the restricted area is a room in a hotel, the user is a guest in the hotel, and the restricted area identifier is a room number of the room.

3. A key printing method for access to a temporary unit for an establishment who controls access to the temporary unit for a limited period of time comprising:
   establishing, by a check-in computer system, a connection with a mobile device;
   creating, by the check-in computer system, a digital key and a status associated with one or more secured areas, wherein the one or more secured areas includes:
      the temporary unit assigned to the digital key, and
      another secured area only accessible according to the status;
   transmitting, by the check-in computer system, the digital key and status to the mobile device;

receiving, by a key printing system, a connection request from the mobile device, wherein the key printing system is configured to receive a removable smart card encapsulating a proprietary key algorithm of a lock vendor for the temporary unit;

establishing, by the key printing system, an exclusive connection with the mobile device;

receiving, by the key printing system, the digital key and status from the mobile device;

authenticating, by the key printing system, the mobile device; and transforming, by the key printing system, the digital key and status to a physical key by printing the physical key with a unique image that is a function of a unique ID (UID) of the physical key and the proprietary key algorithm while off-line, wherein the physical key is operable for access to the temporary unit and the another secured area without needing any communication from the key printing system or mobile device after the physical key is printed.

4. A key printing system for access to a temporary unit for an establishment who controls access to the temporary unit for a limited period of time, comprising: a kiosk having a housing, the kiosk comprising:
a physical key printer;
a receiver that is configured to receive digital key information from a mobile device of a user based on user input provided to at least one of the kiosk or the mobile device, the digital key information including an encrypted digital key;
a memory storing instructions; and
a processor that is configured to execute instructions to perform:
validating, through an exclusive connection with the mobile device, the mobile device upon receiving the user input and based on credentials information;
upon successfully validating the mobile device, extracting a digital key from the mobile device;
producing a physical key with a unique ID (UID) for the user using the physical key printer using a smart-card-encapsulated key algorithm proprietary to lock vendor for the establishment, the physical key having the digital key and being configured to access a restricted area to which the user has privileges, wherein the physical key is a function of the UID and the smart-card-encapsulated key algorithm; and
outputting the physical key through the housing wherein the physical key is operable for access to the temporary unit without any communication from the physical key printer or mobile device after the physical key is printed.

5. The key printing system of claim 4, wherein the digital key is assigned to the restricted area to which the user has been granted privileges, the digital key being created using a lock server.

6. The key printing system of claim 4, wherein the processor is configured to perform establishing the exclusive connection to the mobile device prior to receiving the digital key information.

7. The key printing system of claim 6, wherein validating the mobile device includes decrypting the encrypted digital key into the digital key and a shared key and challenging and authenticating the mobile device based on the shared key.

8. The key printing system of claim 6, wherein the kiosk further comprises a display having an interface, and wherein the processor is configured to perform detecting the mobile device prior to establishing the exclusive connection and changing the interface based on the detecting.

9. The key printing system of claim 4, wherein the physical key comprises one of a magnetic stripe, an RFID card, or a bar code.

10. The key printing system of claim 4, wherein the physical key printer comprises a card hopper that is disposed inside the housing, the card hopper being configured to hold a plurality of physical keys.

11. The key printing system of claim 4, wherein the processor is configured to perform validating the mobile device, extracting the digital key, and producing the physical key while offline.

12. A key printing system for access to a temporary unit for an establishment who controls access to the temporary unit for a limited period of time, comprising:
a kiosk having an exterior casing configured to house material to produce a physical key, the kiosk comprising:
a physical key printer;
a receiver operable to receive, through an exclusive connection with a mobile device, a mobile device identifier from the mobile device of a user;
a memory storing instructions and being configured to store digital key information; and
a processor that is coupled to the memory and that is configured to execute the instructions to perform:
communicating with an application of the mobile device of the user to receive user input;
upon receiving the user input, validating the mobile device;
upon successfully validating the mobile device, receiving the digital key information from the mobile device, wherein the digital key information includes a status;
extracting a digital key and the status from the mobile device based on the digital key information; and
producing a physical key with a unique ID (UID) based on the extracted digital key and the status using the physical key printer using a smart-card-encapsulated key algorithm proprietary to lock vendor for the establishment and the material to produce the physical key, the physical key being configured, when read by a reader at a restricted area to which the user has privileges, to authenticate the user to the restricted area based on the digital key, wherein:
a unique image on the physical key is a function of the UID and the smart-card-encapsulated key algorithm,
the restricted area is the temporary unit,
the status controls access to another restricted area separate from the temporary unit, and
the physical key is operable for access to the temporary unit and another restricted area without any communication from the physical key printer or mobile device after the physical key is printed.

13. The key printing system of claim 12, wherein the processor is configured to perform validating the mobile device, extracting the digital key, and producing the physical key while offline.

14. The key printing system of claim 13, wherein the physical key includes a secure element that is configured to securely encapsulate cryptographic functionality of the digital key.

15. The key printing system of claim 14, wherein the physical key comprises a smart card computing environment that supports cryptographic functions for the secure encapsulation.

16. The key printing system of claim 15, wherein the smart card computing environment is Java Card.

17. The key printing system of claim 14, wherein the secure element employs a public key infrastructure.

18. The key printing system of claim 12, wherein the processor is further configured to execute the instructions to perform receiving credentials information from the mobile device, wherein validating the mobile device is based on validating the credentials information.

19. The key printing system of claim 12, wherein the receiver is a Bluetooth® low energy device.

20. The key printing system of claim 12, wherein communicating with the application on the mobile device includes determining signal strength of the mobile device, the signal strength based on a distance of the mobile device to the receiver.

21. The key printing system of claim 20, wherein validating the mobile device occurs only after a predetermined threshold of signal strength is determined.

\* \* \* \* \*